United States Patent
Kohada (10) Patent No.: US 12,547,542 B2
(45) Date of Patent: Feb. 10, 2026

(54) CACHE MEMORY CONTROL APPARATUS AND CACHE MEMORY CONTROL METHOD

(71) Applicant: Mitsubishi Electric Corporation, Tokyo (JP)

(72) Inventor: Tetsuhiro Kohada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/714,587

(22) PCT Filed: Feb. 28, 2022

(86) PCT No.: PCT/JP2022/008268
§ 371 (c)(1),
(2) Date: May 30, 2024

(87) PCT Pub. No.: WO2023/162219
PCT Pub. Date: Aug. 31, 2023

(65) Prior Publication Data
US 2025/0045204 A1    Feb. 6, 2025

(51) Int. Cl.
*G06F 12/0802*    (2016.01)
(52) U.S. Cl.
CPC .................... *G06F 12/0802* (2013.01)
(58) Field of Classification Search
None
See application file for complete search history.

(56) References Cited

U.S. PATENT DOCUMENTS

| | | | |
|---|---|---|---|
| 5,734,859 A | 3/1998 | Yorimitsu et al. | |
| 6,226,715 B1* | 5/2001 | Van Der Wolf | G06F 12/121 |
| | | | 711/E12.07 |

(Continued)

FOREIGN PATENT DOCUMENTS

| JP | H07-110788 A | 4/1995 |
|---|---|---|
| JP | H11-288387 A | 10/1999 |

(Continued)

OTHER PUBLICATIONS

International Search Report and Written Opinion mailed on Apr. 19, 2022, received for PCT Application PCT/JP2022/008268, filed on Feb. 28, 2022, 9 pages including English Translation.

(Continued)

*Primary Examiner* — Michael Alsip
(74) *Attorney, Agent, or Firm* — XSENSUS LLP (57) ABSTRACT

An object of the present disclosure is to provide a cache memory control apparatus and a cache memory control method capable of improving the efficiency of the cache memory usage. According to the present disclosure, a cache memory control apparatus includes a read request acquisition unit configured to acquire a read request including a location of data in an external storage device, a priority determination unit configured to determine priority of discarding of data stored in a cache memory based on the location of data included in the read request acquired by the read request acquisition unit, and a discarding unit configured to discard data stored in the cache memory based on the priority determined by the priority determination unit.

9 Claims, 11 Drawing Sheets

(56) References Cited

U.S. PATENT DOCUMENTS

| | | | |
|---|---|---|---|
| 8,108,614 B2* | 1/2012 | Sprangle | G06F 12/124 |
| | | | 711/134 |
| 2003/0217230 A1* | 11/2003 | Rodriguez | G06F 12/127 |
| | | | 711/E12.076 |
| 2009/0043967 A1 | 2/2009 | Provenzano et al. | |
| 2016/0182351 A1 | 6/2016 | Wang et al. | |
| 2021/0185142 A1* | 6/2021 | Paduroiu | H04L 65/60 |

FOREIGN PATENT DOCUMENTS

| | | |
|---|---|---|
| JP | 2000-347810 A | 12/2000 |
| JP | 2002-514819 A | 5/2002 |
| JP | 2003-228518 A | 8/2003 |
| JP | 2008-544372 A | 12/2008 |
| JP | 2011-215805 A | 10/2011 |
| JP | 2016-123077 A | 7/2016 |
| WO | 99/59070 A2 | 11/1999 |
| WO | 2006/138249 A2 | 12/2006 |

OTHER PUBLICATIONS

Japanese Office Action issued Apr. 1, 2025, in corresponding Japanese Patent Application No. 2024-502739, 6pp.
Japanese Office Action issued Aug. 12, 2025, in corresponding Japanese Patent Application No. 2024-502739, 7pp.

* cited by examiner

| | $C_1$ $C_2$ $C_3$ $C_4$ $C_5$ $C_6$ | $C_7$ |
|---|---|---|

F I G. 5

F I G. 6

$p-d$ $p$

| | $C_1$ $C_2$ $C_3$ $C_4$ $C_5$ $C_6$ | ⌀ $C_8$ |

CACHE MEMORY CONTROL APPARATUS AND CACHE MEMORY CONTROL METHOD

CROSS-REFERENCE TO RELATED APPLICATION

This application is a national stage application, pursuant to 35 U.S.C. § 371, of International Patent Application No. PCT/JP2022/008268, filed Feb. 28, 2022, the entire contents of which are incorporated herein by reference.

TECHNICAL FIELD

The present disclosure relates to a cache memory control apparatus and a cache memory control method that control a cache memory.

BACKGROUND ART

In cache memory management, retaining data with low reusability constantly decreases the space available for retaining data with high reusability, leading to a decrease in the efficiency of the cache memory usage. Therefore, by discarding data with low reusability from the cache memory, the efficiency of the cache memory usage can be improved. The data of videos or audio used for streaming playback has low reusability; therefore, it is desirable to prioritize discarding such data from the cache memory. In the following, the data of videos or audio used for streaming playback will be referred to as "streaming data".

The cache information used in managing cache memory includes information for identifying the device where the data is stored (the source device of the data), the actual data, and an access history to the cache memory. Here, the information for identifying the device where the data is stored includes the device number, which is a unique number for the device where the data is stored, the storage location of data in the device, and the like. Further, the access history includes the Least Recently Used (LRU) a timestamp indicating the date and time when the cache memory was accessed, and the like. One possible method for determining which data (streaming data) stored in the cache memory should be discarded is to use cache information; however, this method is not efficient due to the time taken for the determination.

Conventionally, various techniques for determining data have been disclosed (for example, see Patent Documents 1 to 5). In Patent Documents 1 and 2, when the size of data subject to a read request exceeds a predetermined size, the data is determined to be streaming data. Further, in Patent Documents 3 to 5, identification information is added to the data when a read request is issued to the cache memory.

PRIOR ART DOCUMENTS

Patent Document(s)

[Patent Document 1] Japanese Patent Application Laid-Open No. 7-110788
[Patent Document 2] Japanese Patent Application Laid-Open No. 11-288387
[Patent Document 3] Japanese Patent Application Laid-Open No. 2000-347810
[Patent Document 4] Japanese Patent Application Laid-Open No. 2016-123077
[Patent Document 5] Japanese Patent Application Laid-Open No. 2011-215805

SUMMARY

Problem to be Solved by the Invention

The size of a read request for streaming data is not necessarily large. Therefore, if the size of a read request for streaming data is small, Patent Documents 1 and 2 cannot determine whether the data requested for reading is streaming data or not.

Also, in standardized interfaces, identification information indicating that the data is streaming data cannot be added. Therefore, Patent Documents 3 to 5 cannot determine whether the data requested for reading is streaming data or not. Here, examples of standardized interfaces include disk device interfaces and file system interfaces. Disk device interfaces include Small Computer System Interface (SCSI), ATA Packet Interface (ATAPI), and SD, among others. File system interfaces include C standard, POSIX standards, among others.

Thus, conventionally, there was room for improvement in the efficiency of cache memory usage.

The present disclosure has been made to solve such problems, and an object thereof is to provide a cache memory control apparatus and a cache memory control method capable of improving the efficiency of cache memory usage.

Means to Solve the Problem

In order to solve the above problems, according to the present disclosure, a cache memory control apparatus includes a read request acquisition unit configured to acquire a read request including a location of data in an external storage device, a priority determination unit configured to determine priority of discarding of data stored in a cache memory based on the location of data included in the read request acquired by the read request acquisition unit, and a discarding unit configured to discard data stored in the cache memory based on the priority determined by the priority determination unit.

Effects of the Invention

According to the present disclosure, the efficiency of the cache memory usage can be improved.

The objects, characteristics, aspects, and advantages of the present disclosure will become more apparent from the following detailed description and the accompanying drawings.

DESCRIPTION OF EMBODIMENT(S)

Related Art

Figure 11:
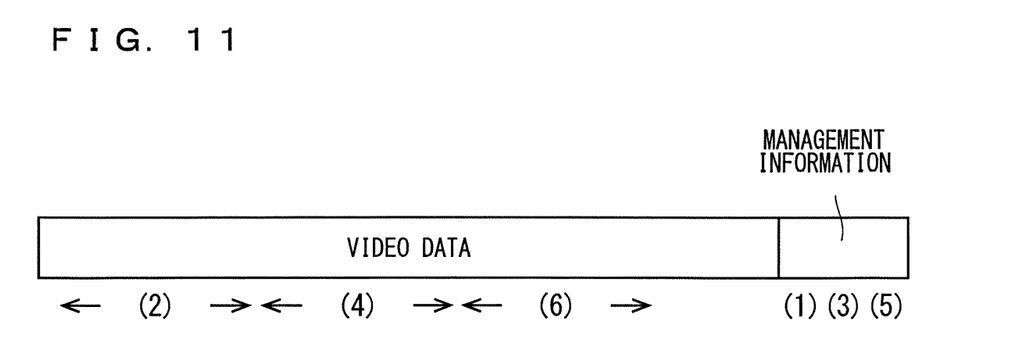
FIG. 11 is a diagram for explaining a cache memory control according to a related art.

FIG. 11 is a diagram for explaining a cache memory control according to a related art.

As illustrated in FIG. 11, the cache memory stores video data and management information. In the cache memory, video files are read block by block in accordance with the following steps (1) to (6) in response to read requests. Each block is assigned a block number. Note that the following steps (1) to (6) correspond to (1) to (6) illustrated in FIG. 11.

(1) Read one block of management information.
(2) Read n blocks of video data.
(3) Read one block of management information.
(4) Read n blocks of video data.
(5) Read one block of management information.
(6) Read n blocks of video data.

Here, controlling the cache memory using the LRU algorithm, which is one of the conventional cache algorithms, with the maximum capacity of the cache memory being C blocks as illustrated in FIG. 11 is considered.

When video data is stored in the cache memory in response to a read request, if the total capacity of the video data and management information stored in the cache memory exceeds the maximum capacity of the cache memory (C blocks), the management information stored in the cache memory is discarded. This necessitates storing the management information in the cache memory again when it is needed next time. In this manner, storing video data with low reusability in the cache memory causes the capacity of the data that should be stored in the cache memory to exceed the maximum capacity, resulting in management information with high reusability being discarded to secure capacity in the cache memory. In this case, every time the capacity of the data that should be stored in the cache memory exceeds the maximum capacity, it is necessary to store the management information in the cache memory again, resulting in the cache not functioning as intended.

Conventionally, as a measure to tackle the above problem, techniques such as those disclosed in Patent Documents 1 to 5 have been disclosed, but as described above, there was room for improvement in the efficiency of cache memory usage.

The present disclosure has been made to solve the above problems, and will be described in detail below.

Embodiment

<Configuration>

Figure 1:
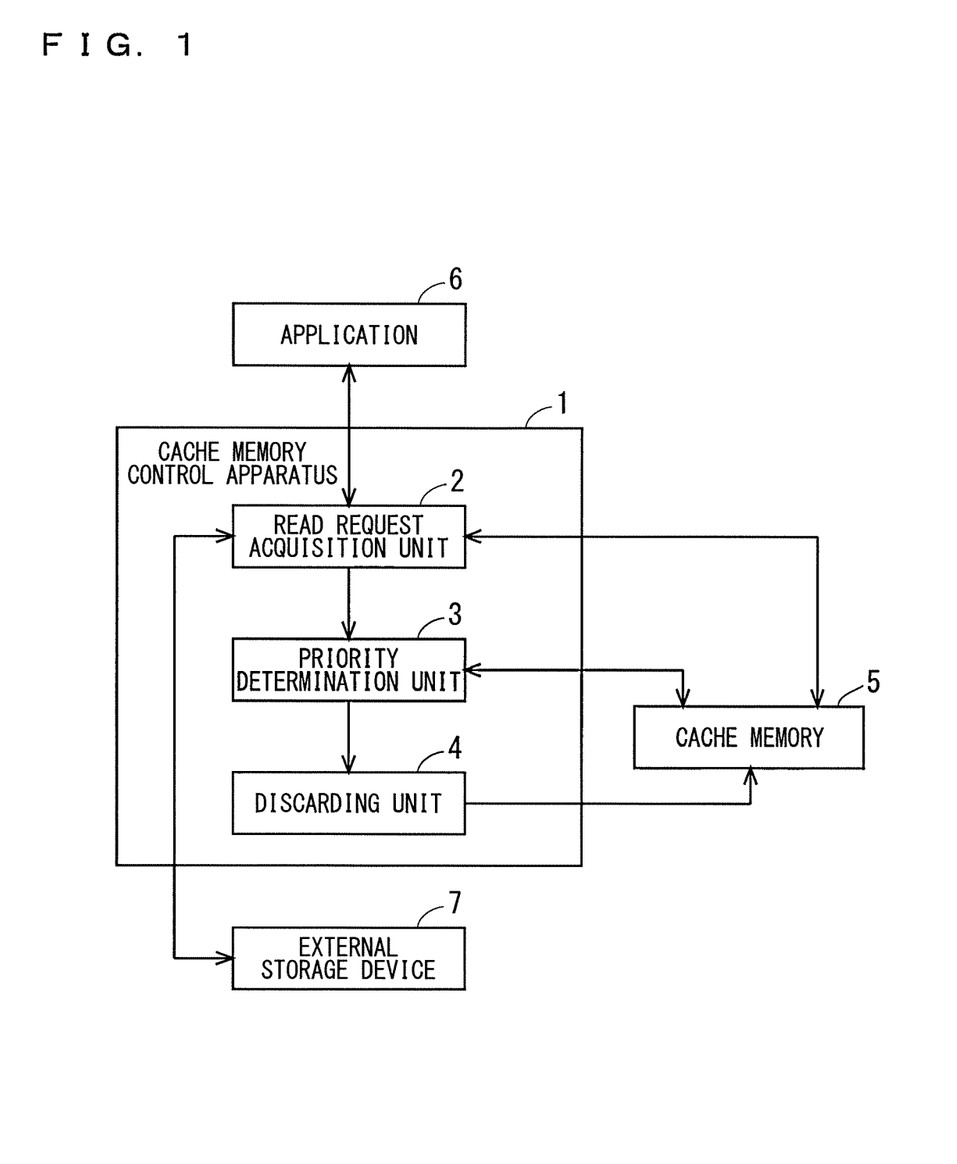
FIG. 1 is a block diagram illustrating an example of a configuration of a cache memory control apparatus according to Embodiment.

FIG. 1 is a block diagram illustrating an example of a configuration of a cache memory control apparatus 1 according to Embodiment.

The cache memory control apparatus 1 includes a read request acquisition unit 2, a priority determination unit 3, and a discarding unit 4, and controls a cache memory 5. Note that the cache memory 5 may be provided separately from the cache memory control apparatus 1 as illustrated in FIG. 1, or may be provided integrally with the cache memory control apparatus 1.

The read request acquisition unit 2 acquires, from an application 6, a read request including a location of data in an external storage device 7. Further, in response to the read request, the read request acquisition unit 2 transmits the data stored in the cache memory 5 to the application 6 or stores the data stored in the external storage device 7 in the cache memory 5.

The application 6 has a function of streaming video or audio. The application 6 is installed in, for example, a navigation device or a mobile communication terminal. Further, the device or terminal with the application 6 installed may be provided separately from the cache memory control apparatus 1 as illustrated in FIG. 1, or may be provided integrally with the cache memory control apparatus 1.

The external storage device 7 is, for example, a storage medium such as an SD card memory or a Hard Disk Drive (HDD), and does not include a main storage device (main memory). Note that the external storage device 7 may be provided separately from the cache memory control apparatus 1 as illustrated in FIG. 1, or may be provided integrally with the cache memory control apparatus 1 and the cache memory 5.

The priority determination unit 3 determines the priority of discarding data stored in the cache memory 5 based on a location of data included in the read request acquired by the read request acquisition unit 2.

The discarding unit 4 discards the data stored in the cache memory 5 based on the priority determined by the priority determination unit 3.

<Operation>

Figure 2:
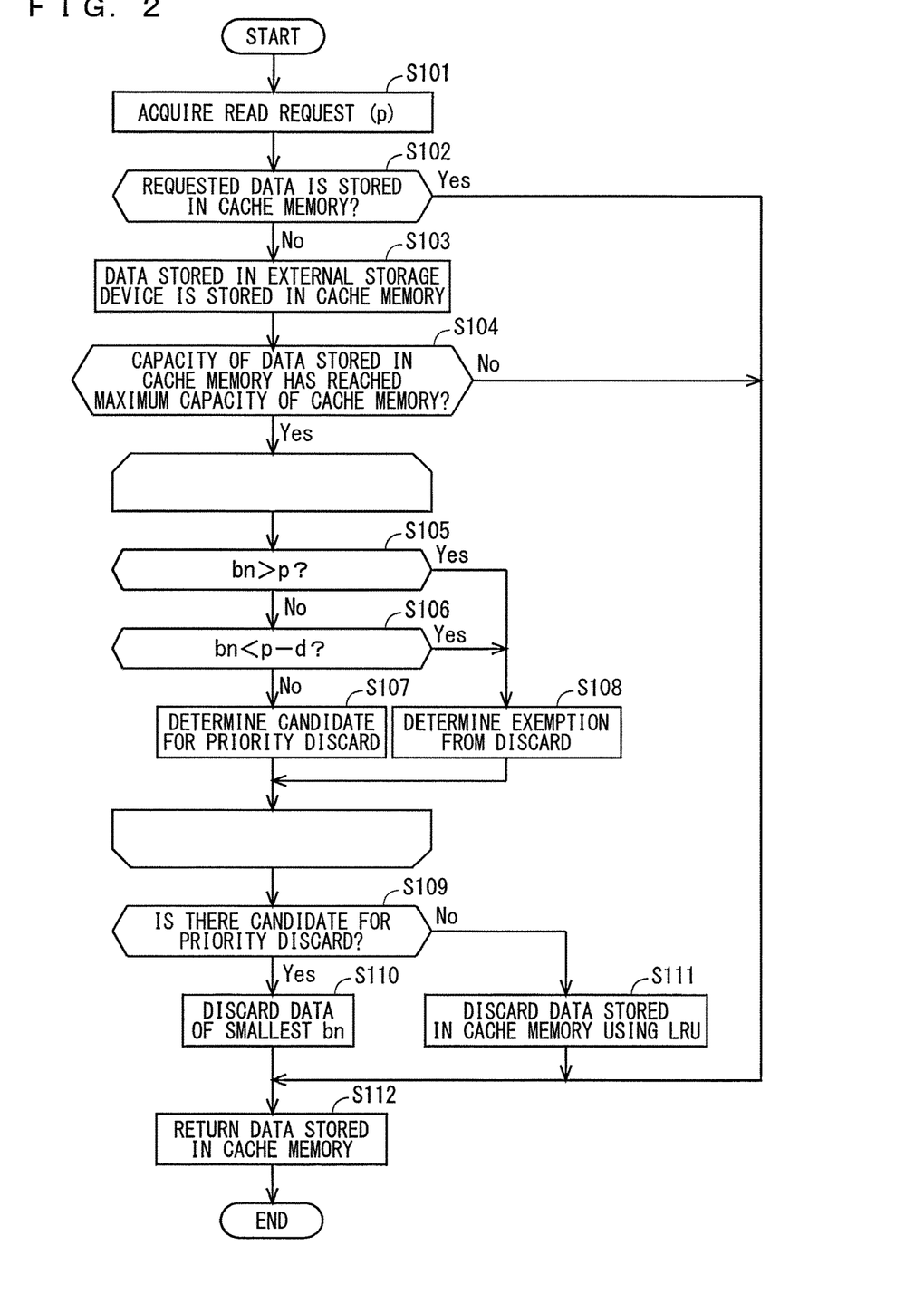
FIG. 2 is a flowchart illustrating an example of an operation of the cache memory control apparatus according to Embodiment.
Figure 3:
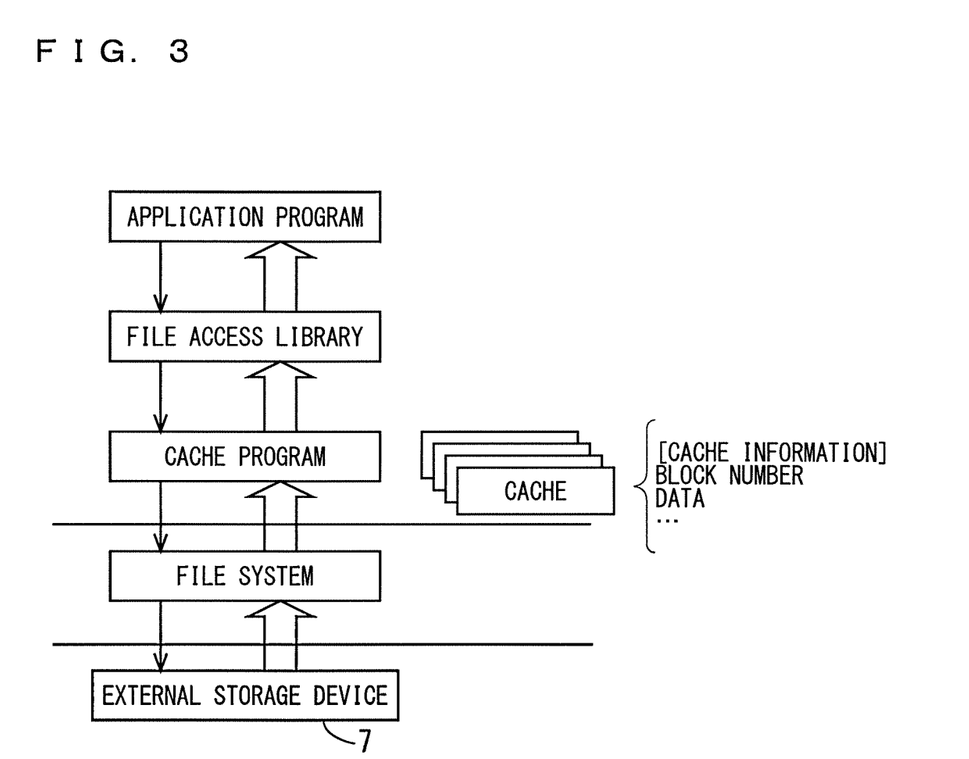
FIG. 3 is a diagram for explaining an operation of the cache memory control apparatus according to Embodiment.

FIG. 2 is a flowchart illustrating an example of an operation of the cache memory control apparatus 1. FIG. 3 is a diagram for explaining the operation of the cache memory control apparatus 1. In the following, the operation of the cache memory control apparatus 1 will be described referring to FIGS. 2 and 3.

Note that the application program illustrated in FIG. 3 corresponds to the application 6 illustrated in FIG. 1. A cache illustrated in FIG. 3 corresponds to the cache memory 5 illustrated in FIG. 1.

Further, the cache program is executed by the cache memory control apparatus 1. The file system is operated by an operating system (OS).

In Step S101, the read request acquisition unit 2 acquires a read request from the application 6. In the example of FIG. 3, the cache program obtains the read request from the application program via a file access library. The read request includes a block number p indicating the location of data in the external storage device 7. Note that the information indicating the location of data is not limited to the block number, and file offset, sector numbers, or the like may also be adopted.

In Step S102, the read request acquisition unit 2 determines whether or not the data subject to the read request is stored in the cache memory 5. In the example of FIG. 3, the cache program determines whether or not the data subject to the read request is stored in a cache. If the data subject to the read request is stored in the cache memory 5, the process proceeds to Step S112. On the other hand, if the data subject to read request is not stored in the cache memory 5, the process proceeds to Step S103.

In Step S103, the read request acquisition unit 2 reads the data subject to the read request from the external storage device 7 and stores the read data in the cache memory 5. In the example of FIG. 3, the cache program reads the data subject to the read request from the external storage device 7 via the file system, and stores the read data in the cache.

In Step S104, the priority determination unit 3 determines whether or not the capacity of data stored in the cache memory 5 has reached the maximum capacity of the cache memory 5. In the example of FIG. 3, the cache program determines whether or not the capacity of data stored in the cache has reached the maximum capacity of the cache. Here, the data capacity reaching the maximum capacity of the cache memory 5 is not necessarily the case where the data capacity precisely equates to the maximum capacity, and may include the case where the data capacity reaches a capacity that is predeterminedly less than the maximum capacity. When the capacity of the data stored in the cache memory 5 reaches the maximum capacity of the cache memory 5, the process proceeds to Step S105. On the other hand, when the capacity of the data stored in the cache memory 5 has not reached the maximum capacity of the cache memory 5, the process proceeds to Step S112.

The processes from Step S105 to Step S108 are performed for all blocks in the cache memory 5.

In Step S105, the priority determination unit 3 determines whether or not the block number $b_n$ in the cache memory 5 is greater than the block number p included in the read request. In the example of FIG. 3, the cache program determines whether or not the block number $b_n$ in the cache is greater than the block number p included in the read request. If the block number $b_n$ in the cache memory 5 is greater than the block number p included in the read request, the process proceeds to Step S108. On the other hand, if the block number $b_n$ in the cache memory 5 is not greater than the block number p included in the read request, the process proceeds to Step S106.

In Step S106, the priority determination unit 3 determines whether or not the block number $b_n$ in the cache memory 5 is smaller than a block number that is predeterminedly blocks d smaller than the block number p included in the read request. In the example of FIG. 3, the cache program determines whether or not the block number $b_n$ in the cache is smaller than the block number that is predeterminedly blocks d smaller than the block number p included in the read request. If the block number $b_n$ in the cache memory 5 is smaller than the block number that is predeterminedly blocks d smaller than the block number p included in the read request, the process proceeds to Step S108. On the other hand, if the block number $b_n$ in the cache memory 5 is not smaller than the block number that is predeterminedly blocks d smaller than the block number p included in the read request, the process proceeds to Step S107.

In Step S107, the priority determination unit 3 determines the data of the block number $b_n$ in the cache memory 5 as a candidate for priority discard. In the example of FIG. 3, the cache program determines the data of the block number $b_n$ in the cache as a candidate for priority discard.

In Step S108, the priority determination unit 3 determines the data of the block number $b_n$ in the cache memory 5 as an exemption from discard. In the example of FIG. 3, the cache program determines the data of the block number $b_n$ in the cache as an exemption from discard.

In Step S109, the discarding unit 4 determines whether or not there is a candidate for priority discard determined in Step S107. In the example of FIG. 3, the cache program determines whether or not there is a candidate for priority discard determined in Step S107. If there is a candidate for priority discard, the process proceeds to Step S110. On the other hand, if there is not a candidate for priority discard, the process proceeds to Step S111.

In Step S110, the discarding unit 4 discards the data of the smallest block number $b_n$ among the candidates for priority discard determined in Step S107. In the example of FIG. 3, the cache program discards the data of the smallest block number $b_n$ among the candidates for priority discard determined in Step S107.

Figure 4:
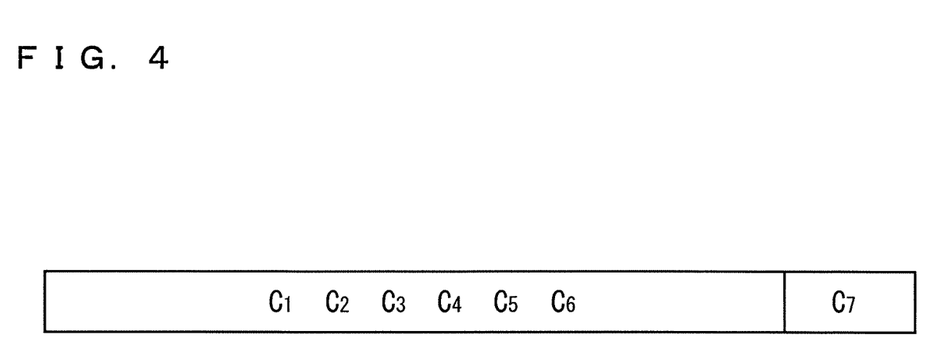
FIG. 4 is a diagram illustrating an example of data stored in a cache memory according to Embodiment.

For example, assume that data $C_1$ to $C_7$ are stored in the cache memory 5, as illustrated in FIG. 4. Note that $C_1$ to $C_6$ in FIG. 4 are video data, and $C_7$ is management information. The same applies to FIGS. 5 and 6, which will be described later.

Figure 5:
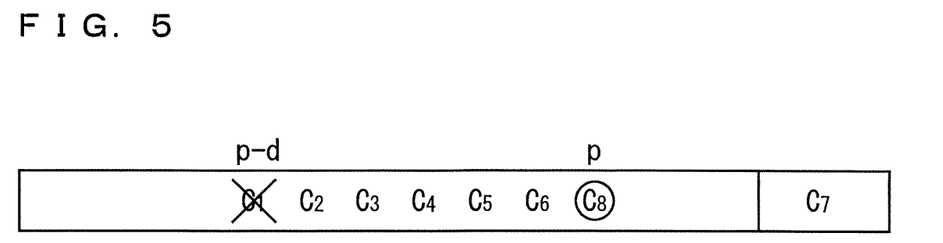
FIG. 5 is a diagram illustrating an example of discarding data from the cache memory according to Embodiment.

As illustrated in FIG. 5, when data $C_8$ is added to the cache memory 5 and the capacity of the data stored in the cache memory 5 reaches the maximum capacity of the cache memory 5, the discarding unit 4 discards data $C_1$ of the smallest block number among the data stored within the range of block numbers p to p−d.

Figure 6:
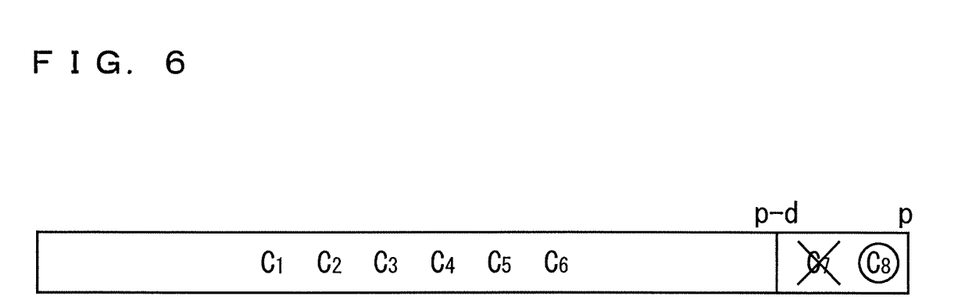
FIG. 6 is a diagram illustrating an example of discarding data from the cache memory according to Embodiment.

Also as illustrated in FIG. 6, when data $C_8$ is added to the cache memory 5 and the capacity of the data stored in the cache memory 5 reaches the maximum capacity of the cache memory 5, the discarding unit 4 discards data $C_7$ of the smallest block number among the data stored within the range of block numbers p to p−d.

In Step S111, the discarding unit 4 discards the data stored in the cache memory 5 using LRU. In the example of FIG. 3, the cache program discards the data stored in the cache using LRU. Note that, the description here has been concerned with the case of using LRU, which is a method of discarding the data that has been least recently used among the data stored in the cache memory 5, however, the method is not limited thereto. For example, the data stored in the cache memory 5 may be discarded using other conventional techniques such as Least Frequently Used (LFU), which is a method that discards the data with the lowest frequency of use among the data stored in the cache memory 5.

In Step S112, the read request acquisition unit 2 returns, to the application 6, the data subject to the read request out of the data stored in the cache memory 5. In the example of FIG. 3, the cache program returns the data subject to the read request out of the data stored in the cache to the application program via the file access library.

<Modification 1>

In the cache memory 5, the priority determination unit 3 may decide to preferentially discard the data stored within a predetermined range with reference to the location of data included in the read request acquired by the read request acquisition unit 2. That is, the priority determination unit 3 may decide to preferentially discard the data near the location of data included in the read request.

<Modification 2>

In the cache memory 5, the priority determination unit 3 may decide to preferentially discard the data stored within a predetermined range with reference to the location of data that is predeterminedly blocks smaller than the location of data included in the read request acquired by the read request acquisition unit 2. That is, the priority determination unit 3 may decide to preferentially discard the data located near a location that serves as a reference, which is a reference that is predeterminedly blocks smaller than the location of data included in the read request.

Figure 7:
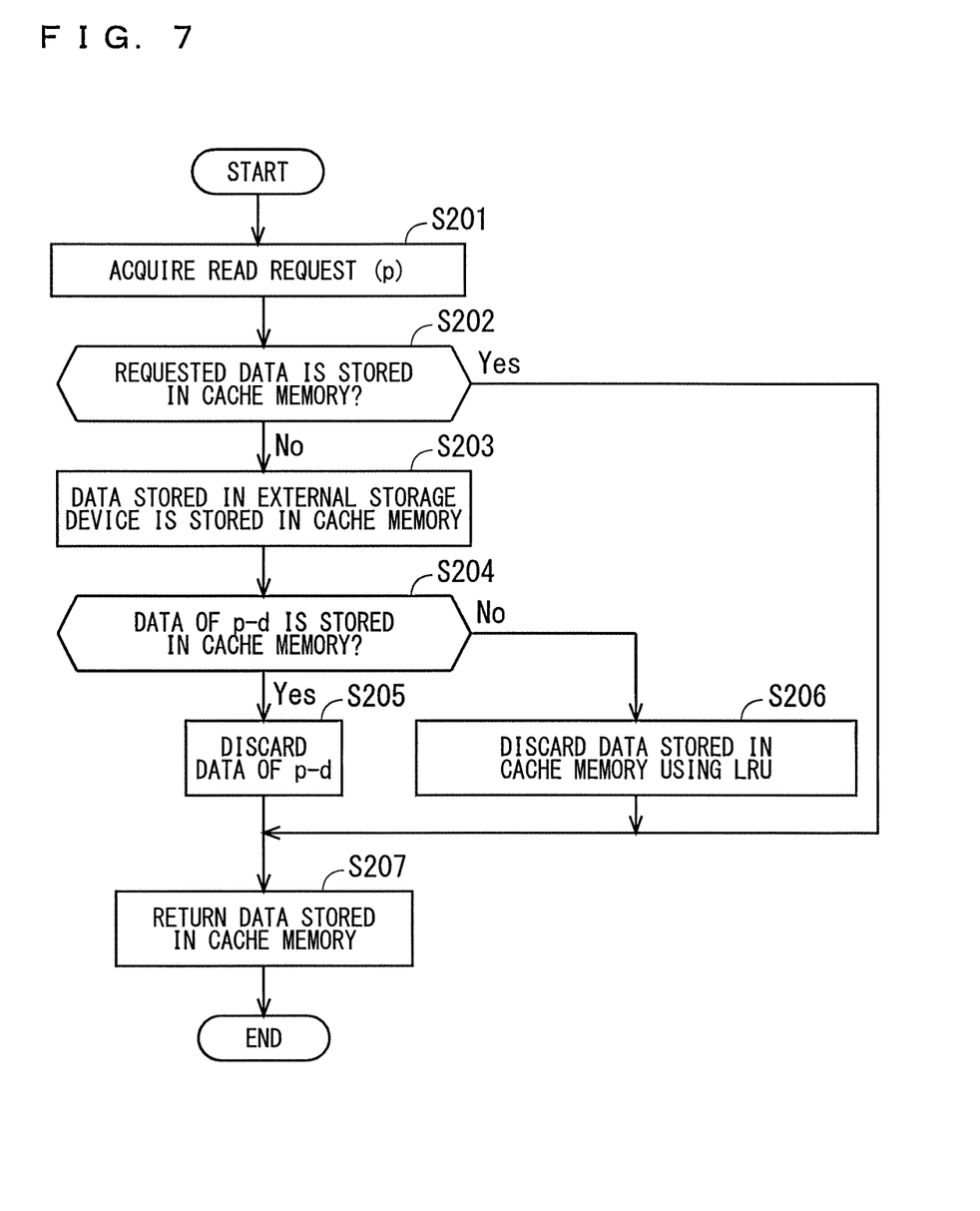
FIG. 7 is a flowchart illustrating an example of an operation of the cache memory control apparatus according to Embodiment.

FIG. 7 is a flowchart illustrating an example of an operation of the cache memory control apparatus 1 according to Modification 2. Note that here the description of Steps S201 to S203, Step S206, and Step S207 in FIG. 7 is omitted as they correspond to Steps S101 to S103, Step S111, and Step S112 in FIG. 1. In the following, Step S204 and Step S205 will be described.

In Step S204, in the cache memory 5, the priority determination unit 3 determines whether or not the data of the block number (p−d) that is predeterminedly blocks d smaller than the block number p included in the read request is stored. If the data of the block number that is predeterminedly blocks d smaller than the block number p is stored, the process proceeds to Step S205. On the other hand, if the data of the block number that is predeterminedly blocks d smaller than the block number p is not stored, the process proceeds to Step S206.

In Step S205, the priority determination unit 3 determines to preferentially discard the data of the block number (p−d) in the cache memory 5. The discarding unit 4 discards the data of the block number (p−d) determined by the priority determination unit) 3. At this point, the discarding unit 4 may discard not only the data of the block number (p−d) but also the data near the block number (p−d).

<Modification 3>

In the cache memory 5, the priority determination unit 3 may decide to preferentially discard the data of smallest number among consecutively recorded data spanning a certain number of blocks or more stored within a predetermined range with reference to the location of data included in the read request acquired by the read request acquisition unit 2.

<Modification 4>

Figure 8:
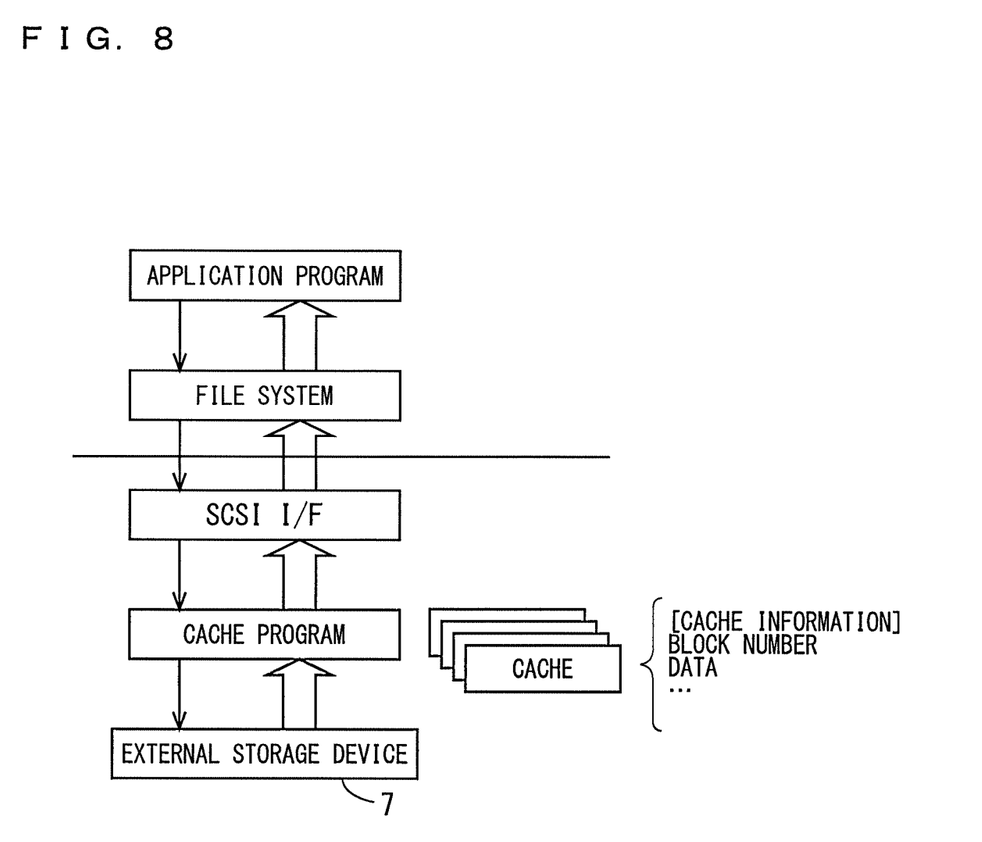
FIG. 8 is a diagram for explaining an operation of the cache memory control apparatus according to Embodiment.

Although the above description has been made using the configuration example illustrated in FIG. 3, the configuration is not limited thereto. For example, a configuration example illustrated in FIG. 8, operations similar to the described above can also be performed.

<Effect>

As described above, in the cache memory control apparatus 1, the priority determination unit 3 determines the priority based on the result of comparison between the location of data included in the read request acquired by the read request acquisition unit 2 and the location of data retained in the cache memory 5. As a result, the data subject to discarding among the data stored in the cache memory 5 can be discarded irrespective of the data identification information added when issuing a read request or the size of the data subject to the read request, as in the conventional technology. According to the present disclosure, the efficiency of the cache memory usage can be improved.

<Hardware Configuration>

Each function of the read request acquisition unit 2, the priority determination unit 3, and the discarding unit 4 in the cache memory control apparatus 1 illustrated in FIG. 1 is implemented by a processing circuit. That is, the cache memory control apparatus 1 includes a processing circuit for acquiring the read request including a location of data in the external storage device 7, determining the priority of discarding data stored in the cache memory 5 based on the location of data included in the read request, and discarding the data stored in cache memory 5 based on the determined priority. The processing circuit may either be dedicated hardware, or a processor that executes a program stored in a memory (a Central Processing Unit (CPU), a central processing unit, a processing unit, an arithmetic unit, a microprocessor, a microcomputer, a Digital Signal Processor (DSP).

Figure 9:
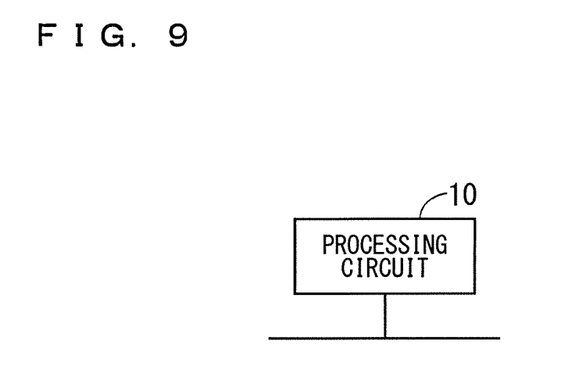
FIG. 9 is a block diagram illustrating an example of a hardware configuration of the cache memory control apparatus according to Embodiment.

When the processing circuit is dedicated hardware, as illustrated in FIG. 9, the processing circuit 10 may correspond, for example, to a single circuit, a composite circuit, a programmed processor, a parallel programmed processor, an Application Specific Integrated Circuit (ASIC), a Field Programmable Gate Array (FPGA), or a combination of any of these. Each function of the read request acquisition unit 2, the priority determination unit 3, and the discarding unit 4 may be implemented by the processing circuit 10, or each function may be collectively implemented by the processing circuit 10.

Figure 10:
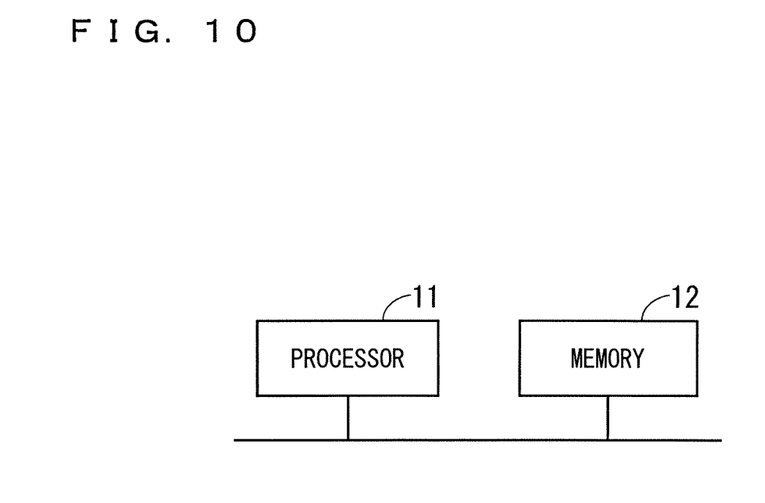
FIG. 10 is a block diagram illustrating an example of a hardware configuration of the cache memory control apparatus according to Embodiment.

When the processing circuit 10 is a processor 11 illustrated in FIG. 10, each function of the read request acquisition unit 2, the priority determination unit 3, and the discarding unit 4 is implemented by software, firmware, or a combination of software and firmware. Software or firmware is written as programs and stored in the memory 12. The processor 11 implements each function by reading and executing the program recorded in the memory 12. That is, the cache memory control apparatus 1 includes the memory 12 for storing programs that eventually execute a step of acquiring the read request including a location of data in the external storage device 7, a step of determining the priority of discarding data stored in the cache memory 5 based on the location of data included in the read request, and a step of discarding the data stored in cache memory 5 based on the determined priority. It can also be said that these programs cause the computer to execute the procedures or methods of the read request acquisition unit 2, the priority determination unit 3, and the discarding unit 4. Here, the memory may be any non-volatile or volatile semiconductor memory, such as a Random Access Memory (RAM), a Read Only Memory (ROM), a flash memory, an Erasable Programmable Read Only Memory (EPROM), an Electrically Erasable Programmable Read Only Memory (EEPROM), as well as a magnetic disk, a flexible disk, an optical disk, a compact disk, a Digital Versatile Disc (DVD), or any other storage medium that may be used in the future.

Note that each function of the read request acquisition unit 2, the priority determination unit 3, and the discarding unit 4 may be partially implemented by dedicated hardware, and partially implemented by software or firmware.

Accordingly, the processing circuit can implement each of the above functions using hardware, software, firmware, or a combination thereof.

It should be noted that Embodiment can be appropriately modified or omitted within the scope of the present disclosure.

The present disclosure has been thoroughly described, however, the above description is illustrative in all aspects, and are not limitative. It is understood that numerous undescribed modifications and variations can be devised.

EXPLANATION OF REFERENCE SIGNS 1 cache memory control apparatus, 2 read request acquisition unit, 3 priority determination unit, 4 discarding unit, 5 cache memory, 6 application, 7 external storage device, 10 processing circuit, 11 processor, 12 memory.

The invention claimed is:

1. A cache memory control apparatus comprising:
a processor to execute a program, and
a memory to store the program which, when executed by the processor, performs processes of
acquiring a read request including a location of data in an external storage device;
determining priority of discarding of data stored in a cache memory based on the location of data included in the acquired read request;
determining a size of the data stored in the cache memory; and
discarding data stored in the cache memory based on the determined priority only when the size of the data stored in the cache memory is determined to have reached a threshold capacity of the cache memory,
wherein the threshold capacity of the cache memory is equal to a maximum capacity of the cache memory minus a predetermined amount of memory.

2. The cache memory control apparatus according to claim 1, wherein
the cache memory is configured to retain data and a location where the data is stored,
the determining includes to determine the priority based on a result of comparing the position of data included in the acquired read request with the position of data retained in the cache memory.

3. The cache memory control apparatus according to claim 2, wherein
in the cache memory, the determining includes to determine to preferentially discard data stored within a predetermined range with reference to the location of data included in the acquired read request, and
the discarding includes to preferentially discard the determined data.

4. The cache memory control apparatus according to claim 2, wherein
in the cache memory, the determining includes to determine to preferentially discard data stored within a predetermined range with reference to a location of data that is a predetermined number of blocks smaller than the location of data included in the acquired read request, and
the discarding includes preferentially discarding the determined data.

5. The cache memory control apparatus according to claim 2, wherein
in the cache memory, the determining includes to determine to preferentially discard data of smallest location among data stored within a predetermined range with reference to the location of data included in the acquired read request.

6. The cache memory control apparatus according to claim 2, wherein
in the cache memory, the determining includes to determine to preferentially discard data of smallest location among data consecutively stored data spanning a certain number of blocks or more within a predetermined range with reference to the location of data included in the acquired read request.

7. The cache memory control apparatus according to claim 1, wherein
when the priority is unable to be determined, the discarding includes to discard data that has been least recently used among data stored in the cache memory.

8. The cache memory control apparatus according to claim 1, wherein
when the priority is unable to be determined, the discarding includes to discard data that has been least frequently used among data stored in the cache memory.

9. A cache memory control method comprising:
acquiring a read request including location information of data in an external storage device;
determining priority of discarding data stored in a cache memory based on the acquired location information;
determining a size of the data stored in the cache memory; and
discarding data stored in the cache memory based on the determined priority only when the size of the data stored in the cache memory is determined to have reached a threshold capacity of the cache memory; and
setting the threshold capacity of the cache memory to be a maximum capacity of the cache memory minus a predetermined amount of memory.

* * * * *